United States Patent [19]

Drew et al.

[11] 3,729,618

[45] Apr. 24, 1973

[54] SCANNING MECHANISM AND PRINTER

[75] Inventors: Robert S. Drew, Knightdale; John E. Jones, Raleigh, both of N.C.

[73] Assignee: International Business Machines Corporation, Armonk, N.Y.

[22] Filed: June 12, 1972

[21] Appl. No.: 261,850

[52] U.S. Cl. ....................235/61.11 E, 178/7.6

[51] Int. Cl. ....................G06k 7/14, H04n 3/00

[58] Field of Search ..............235/61.11 R, 61.11 D, 235/61.11 E, 61.9 R; 250/219 D, 219 DC, 219 DD; 101/11, 93 C; 340/146.3 F; 178/7.6

[56] References Cited

UNITED STATES PATENTS

| | | | |
|---|---|---|---|
| 2,666,807 | 1/1954 | Hunt, Jr. | 250/219 D |
| 3,614,394 | 10/1971 | Bindshedler | 235/61.11 D |
| 3,456,997 | 7/1969 | Stites et al. | 250/219 D |
| 3,634,696 | 1/1972 | Wildhaber | 250/219 D |

*Primary Examiner*—Daryl W. Cook
*Attorney*—John B. Frisone et al.

[57] ABSTRACT

A printer for preparing labels including coded data is provided with an optical scanner having a plurality of spaced parallel slits in fixed registration with said printed coded data, a scanning slit having a substantially different orientation than said fixed slits and means for translating said scanning slits in a first direction to produce a multiplicity of limited distance scans in a second opposite direction.

4 Claims, 5 Drawing Figures

SCANNING MECHANISM AND PRINTER

BACKGROUND OF THE INVENTION

1. Field of the Invention

The invention relates to code scanners in general and more particularly to a code scanner suitable for use in conjunction with a batch coded label printer for scanning a plurality of printed labels to check for proper printing of the code.

2. Description of the Prior Art

The prior art does not include a combined printer and scanner mechanism suitable for printing and scanning in place labels containing coded information. Separate devices for performing each function must be utilized. When separate devices are utilized, a great deal of time is consumed in handling the printed labels and errors are not detected until long after they occur, thus increasing spoiled or defective labels. Labels may be printed on a variety of printing devices. For bar coded data, chain or belt printers are particularly suitable. Printing accuracy and therefore density is increased if the bars comprising the coded data are printed in a horizontal orientation. With a horizontal orientation for the bars, the bar edges are more accurately formed since the "smear" of the printing chain or belt is along the length of the bar rather than the width which contains the information. The scanning motion required to scan the horizontally disposed bar codes is vertical or at right angles which presents the difficulty of scanning vertically a multiplicity of horizontally disposed codes.

SUMMARY OF THE INVENTION

The invention contemplates a scanning mechanism for use in conjunction with coded label printers for scanning a plurality of horizontally disposed coded indicia in which the coded intelligence is vertically disposed. Said scanning mechanism comprising an array of fixed slits disposed in fixed relationship with respect to said coded indicia, a scanning slit having an orientation substantially opposite to the orientation of the array of fixed slits, means for translating said scanning slit with respect to said array of slits and means for detecting and decoding light reflected from the coded indicia and transmitted simultaneously through both the fixed and translated slits.

BRIEF DESCRIPTION OF THE DRAWINGS

FIG. 1 illustrates a typical arrangement of sticky labels or tickets mounted on a pin-feed form. The tickets include printed human readable indicia as well as coded indicia suitable for machine reading. The numeric characters are located on the left side of the tickets or labels and the coded indicia are located on the right side of each of the labels. In the usage contemplated, a large number of similar labels will be prepared on a printer. The coded indicia on the labels must be checked to assure that it is correct. Thereafter, the labels will be affixed to merchandise and utilized later on for taking the data from the merchandise ticket and entering it into an automatic retail control system. It is desirable in checking the tickets on the form that the tickets be checked as soon after preparation as possible to detect errors which can be corrected before large quantities of tickets or labels have been prepared. This is difficult to achieve where the code reading or scanning mechanism is located remote from the printing position.

FIG. 2 illustrates the novel scanning mechanism in juxtaposition to the printer whereby labels as illustrated in FIG. 1 may be printed and checked immediately after printing. The printer illustrated is a chain or belt printer. The details of the printer have been omitted since they are conventional in all respects and only those elements of the printer in juxtaposition to the scanning mechanism have been illustrated. The scanning mechanism in FIG. 2 is located immediately above the chain or belt used for carrying the characters which are to be printed on the labels. The belt or chain 20 is supported on a pair of spaced pulleys 21 and 22. The pulleys are connected to a drive mechanism not shown which causes the belt to rotate continuously. As is well known in the printer art, the characters to be printed on the paper are stored in a buffer and at the appropriate times when the character to be printed is in registration with the position where it is to be printed, impact means not shown causes the character to be printed on the paper. When a line of print has been completed, the paper is indexed in preparation for printing the next line. As the paper is indexed, the previously printed characters are brought into registration with the scanning position. Scanning takes place following printing and at the same time a subsequent line of characters are being printed on subsequent tickets.

Figure 1:
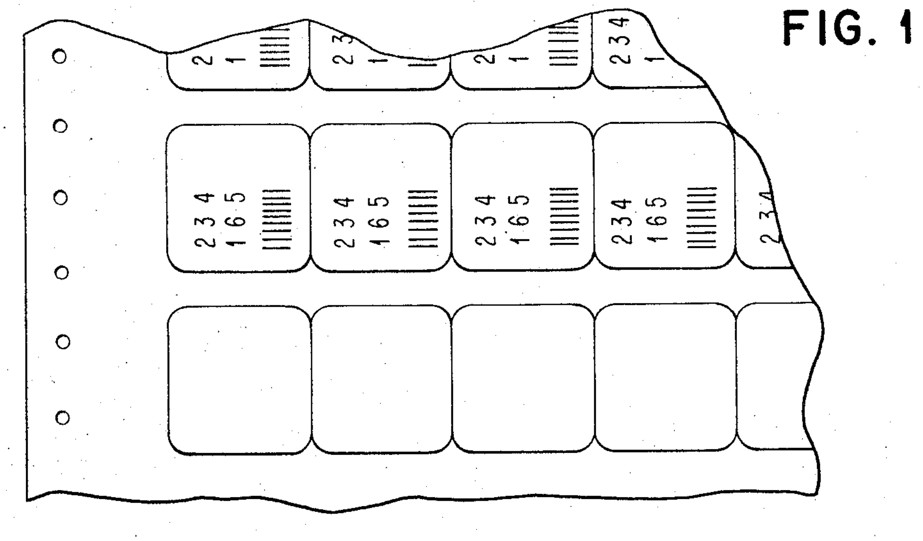
FIG. 1 is a plan view of typical label or ticket stock which bears human readable and coded data.

The scanning mechanism includes a support structure 25 which supports a member 26 in close proximity to the labels or tickets previously printed. Member 26 is provided with a plurality of spaced parallel slits 27 which are arranged at an angle to the direction of travel of the paper and at an angle to the orientation of the bars comprising the coded indicia. The spacing of the slits 27 is such that a plurality of slits will overlie a single coded indicia. Support member 25 carries a lead screw 28 and a guide 29. A scanning head 30 is mounted on the lead screw 28 and guide 29 and is driven along the lead screw and guide by a drive pulley 31 connected via a drive belt 32 to a motive source not illustrated. As pulley 31 turns screw 28, the scanning head 30 is propelled from the left to the right and returns via a second set of screw threads on the screw 28 once it reaches the right hand terminus of the screw 28. The pitch of the return threads is such as to cause the head to travel in the reverse direction faster than in the scanning direction from left to right as viewed in the illustration. The particular drive mechanism illustrated is not critical and is merely illustrative. Any suitable driving means may be employed for translating the scanning head 30 from the left to the right and returning it to the starting position. The structure shown is merely illustrative of the function which must be performed to effect the scanning operation.

Figure 3:
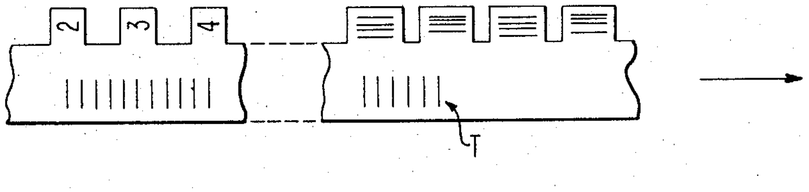
FIG. 3 is a plan view of a portion of an etched belt illustrating the form of both human readable characters and coded indicia.

A section of the belt or chain is illustrated in FIG. 3. The characters including the coded indicia are carried on tabs which extend beyond the belt body proper. Timing marks T are also located on the belt and a reference code suitable for use therewith accurately determines the position of the belt at all times. The structure of the belt and the printer is conventional in every respect and will not be further described. It is illustrated here to enhance understanding of the printing operation and its interaction with the scanning mechanism.

Figure 4:
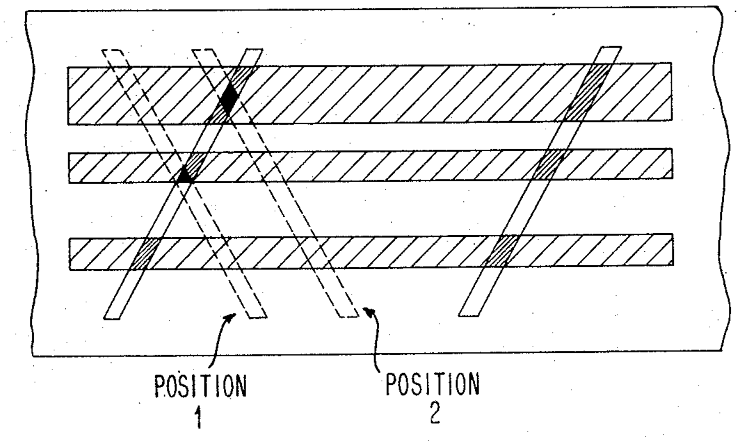
FIG. 4 is a schematic view of the scanning mechanism illustrated in FIG. 2.
Figure 2:
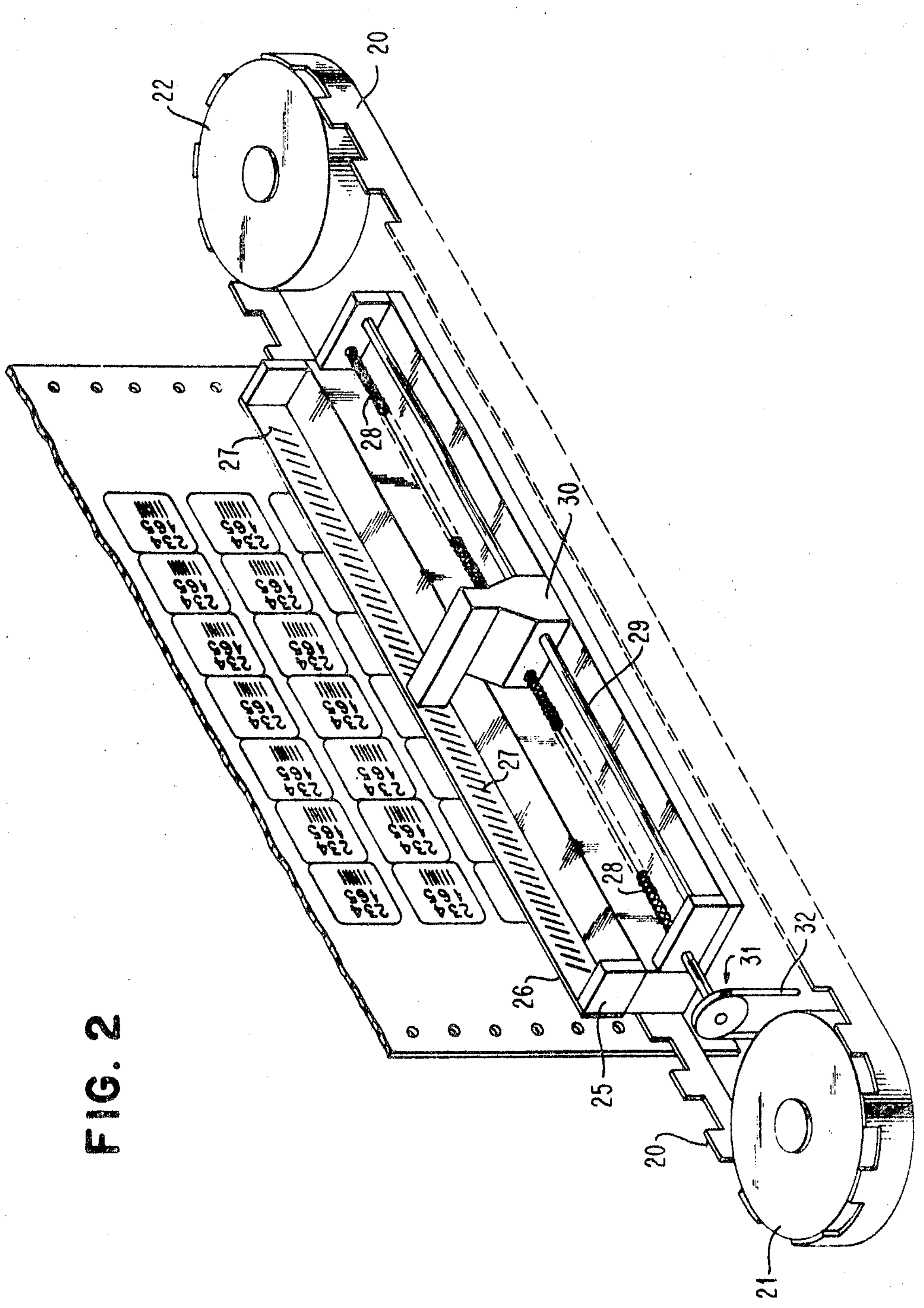
FIG. 2 is a perspective view of the essential scanner and printer elements with supporting structure removed to enhance clarity.

FIG. 4 is a schematic plan view of the scanning mechanism superimposed over bar coded data. Two fixed slits are shown in solid line and the single scanning aperture is illustrated in dotted line at two successive positions. Starting from left to right as the single movable scanning slit proceeds from left to right, light is transmitted back to a light detecting transducer within the head when the fixed slits and the movable single scanning slit coincide; thus, two complete scans of the coded data illustrated will occur as the movable slit moves from left to right. The two portions in communication with the detector are illustrated by the heavy dark area. The medium areas illustrated show the communications path of reflected light through the fixed slits and the areas of the coded material completely masked by the nontransparent areas of the mechanism are shown in lighter shading. As the scan proceeds from left to right, the first or lower most bar in the figure is scanned. Then the area between the first bar and the subsequent bar, is scanned, then the second bar is scanned, the area between the second and third bar follows and then the area covered by the third bar is scanned. It should be noted that the angles the fixed slits and the movable slit make with each other are such that at no point depending upon the minimum spacing between bars will more than one bar area be scanned at any given time.

Figure 5:
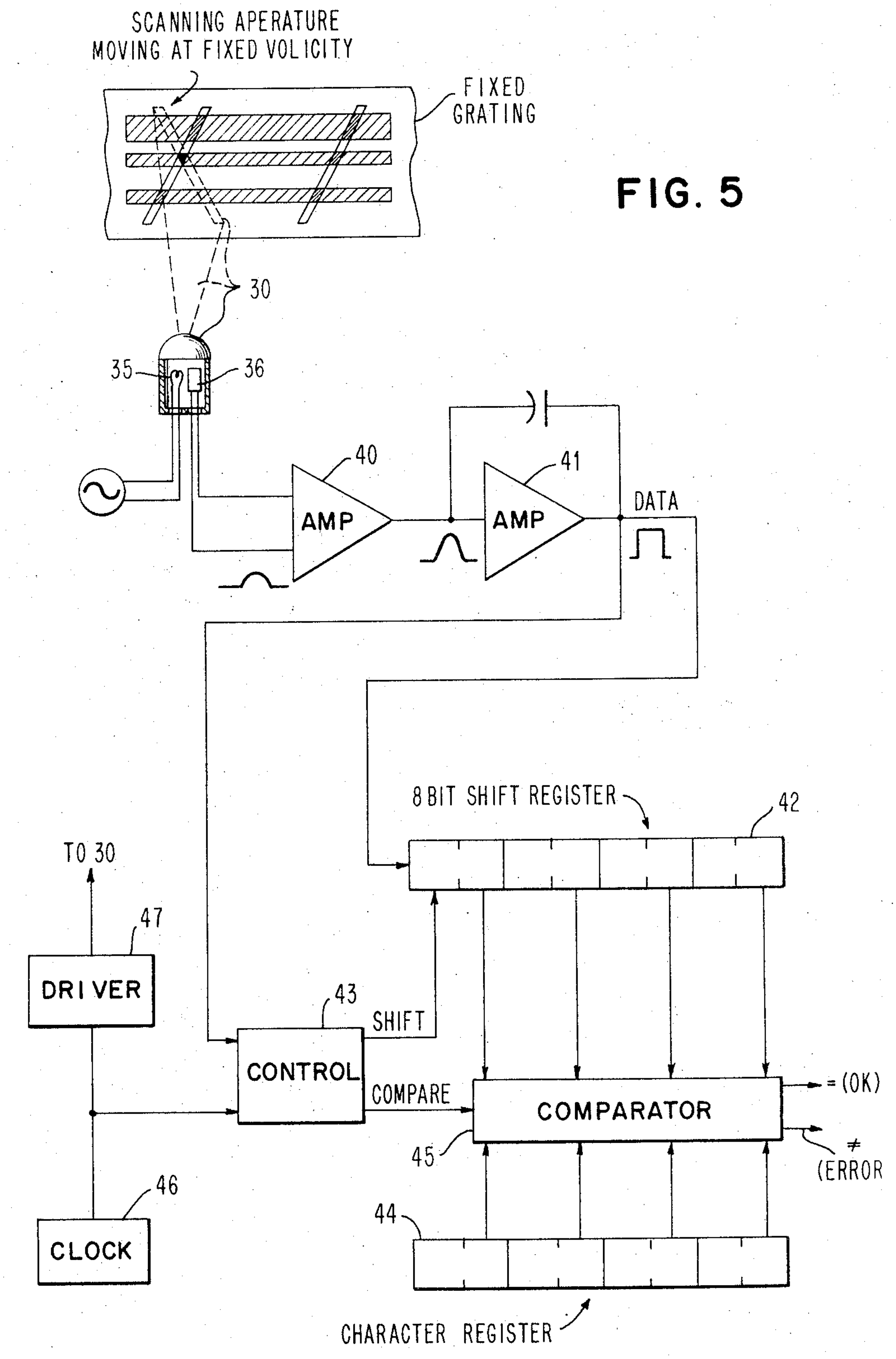
FIG. 5 is a schematic diagram illustrating the scanning mechanism in its operative environment.

FIG. 5 is a diagram illustrating the scanning mechanism schematically. The components illustrated in greater detail in FIG. 4 are reproduced in their physical orientation in FIG. 5. The scanning head includes a light source 35 for illuminating the slits and a photodetector 36. The photodetector 36 provides an output which is an analog of the reflectivity of the areas coincident with both the fixed slit and the scanning slit. The output of the photodetector is applied to a first amplifier 40 which has its output connected to a second feedback amplifier 41 where the signal is squared. The output of amplifier 41 is applied to an *n*-bit shift register 42 which is under control of a control circuit 43 which applies n consecutive shift pulses to register 42 and then enables a comparison of the contents of shift register 42 with the contents of a character register 44 which contains the same data used to print the line being checked. The comparison is made in a comparator circuit 45 which signals an error condition, that is, a failure of comparison when the two quantities; that is, the contents of register 42 and register 44 are not the same. A clock pulse source 46 controls the driving means 47 for the scanning element and pulses for operating control circuit 43; thus, assuring synchronization of the mechanical drive, the shifting of the data into register 42 and the comparison in comparator 45 of the data in register 42 and register 44. Control circuit 43 simply applies *n* consecutive clock pulses to shift register 42 and upon the receipt of *n* consecutive clock pulses, generates the compare signal which is utilized in comparison circuit 45 for effecting the comparison of the contents of the two registers 42 and 44.

While the invention has been particularly shown and described with reference to a preferred embodiment thereof, it will be understood by those skilled in the art that various changes in form and details may be made therein without departing from the spirit and scope of the invention.

What is claimed is:

1. A code scanning mechanism suitable for use in conjunction with a printer for scanning printed coded indicia immediately following printing of the indicia and while the media supporting the indicia is still retained within the media retaining mechanism of the printer comprising:

first means in juxtaposition with said media proximate the printing position, said first means including a plurality of parallel spaced translucent slits in fixed orientation with respect to said media;

movable scanning means having a translucent slit having a different orientation than the plurality of parallel translucent slits included in said first means;

second means for moving said scanning means to produce relative motion between the scanning means and the first means including the parallel translucent slits; and detector means mounted on said scanning means for providing signals indicative of the reflectivity of the media surface simultaneously visible through the slits in the first means and the slit in the scanning means.

2. A code scanning mechanism as set forth in claim 1 in which the slits in the first means are inclined at an angle to the informational direction of the coded indicia on the media and the slit in the scanning mechanism is inclined in a complementary orientation.

3. A code scanning mechanism as set forth in claim 2 in which adjacent slits in said first means do not overlap in the direction of informational content of the indicia.

4. A code scanning mechanism as set forth in claim 3 in which the slit in the scanning means is in coincidence at any give time with only one of the slits in the first means.

* * * * *